United States Patent [19]

Sulzer et al.

[11] Patent Number: 4,656,018

[45] Date of Patent: Apr. 7, 1987

[54] CYCLIC PHOSPHONITRILIC HALIDE PROCESS

[75] Inventors: Gerald M. Sulzer; Joseph B. Tedder, Jr.; J. Robert Adams, Jr.; Matthew K. Juneau, all of Baton Rouge, La.

[73] Assignee: Ethyl Corporation, Richmond, Va.

[21] Appl. No.: 798,910

[22] Filed: Nov. 18, 1985

[51] Int. Cl.$^4$ ............................................. C01B 25/10
[52] U.S. Cl. .................................................... 423/300
[58] Field of Search ......................................... 423/300

[56] References Cited

U.S. PATENT DOCUMENTS 4,567,028 1/1986 Tanino et al. ...................... 423/300

OTHER PUBLICATIONS

Sulkowski et al., Chem. Stos. 26 (2), 245–252 (1982).

Primary Examiner—John Doll
Assistant Examiner—Wayne A. Langel
Attorney, Agent, or Firm—Donald L. Johnson; John F. Sieberth; J. D. Odenweller

[57] ABSTRACT

Cyclic phosphonitrilic halide trimer is made in high yield and at a rapid rate by adding $NH_3$ or ammonium halide to a pyridine-hydrogen halide complex and adding phosphorus pentahalide and a solvent for the trimer (e.g. monochlorobenzene) and heating the mixture to above 90° C. to form trimer which dissolves in the solvent and then separating the trimer-solvent phase from the residue phase of pyridine-hydrogen halide complex and recovering trimer from the solvent phase and recycling the pyridine-hydrogen halide phase to a subsequent procedure conducted in the same manner. The process can also be adapted to produce linear species in high yield also.

42 Claims, No Drawings

CYCLIC PHOSPHONITRILIC HALIDE PROCESS

BACKGROUND OF THE INVENTION

Cyclic polyphosphonitrilic halides can be reacted with alkali metal alkoxides and aryloxides to form derivatives that can be used as hydraulic fluids, flame retardants, or as plasticizers for high molecular weight polyphosphazenes. The most common cyclic polyphosphonitrilic halide is phosphonitrilic chloride trimer. A major use for trimer is in the manufacture of high molecular weight substantially linear polyphosphonitrilic chloride. The high molecular weight polymers can be obtained by merely heating the purified trimer at about 220°–300° C. for a period of 12–48 hours. Preferably the polymerization is conducted in the presence of a very small amount of a Lewis Acid catalyst, e.g. $AlCl_3$, $BCl_3$ and the like. The linear high molecular weight polyphosphonitrilic chloride can be substituted by reaction with alkali metal alkoxides and/or aryloxides to form elastomers having very useful physical properties. These elastomers can be compounded and cured to form useful articles of manufacture. The conventional method for making cyclic phosphonitrilic chloride is to react phosphorus pentachloride with an excess of ammonium chloride in a suitable liquid reaction medium (e.g. monochlorobenzene or sym-tetrachloroethane) at a temperature of about 120°–150° C. This reaction takes several hours to complete and yields a mixture that is about 75–80% trimer. A process has been reported by W. Sulkowski et al., Chem. Stos 26 (2) p. 245–252 (1982), in which pyridine is added to a well-ground mixture of phosphorus pentachloride and ammonium chloride causing the temperature to rise sharply to 180° C. causing strong boiling presumeably of the pyridine. The reaction is complete in minutes giving a low yield of cyclic phosphonitrilic chloride, product consisting mainly of trimer and tetramer. The reaction can also be conducted in sym-tetrachloroethane using quinoline as the nitrogenous base. Although this process is very rapid, it is not practical on a large scale because the large exotherm over such a short reaction period leads to an uncontrollable reaction. Also the yield of cyclics is low.

In U.S. patent application Ser. No. 756,799, filed July 19, 1985 by H. R. Allcock, S. J. Stinnett, J. B. Tedder, Jr. and J. R. Adams, Jr., a process for making cyclic phosphonitrilic chloride trimer is disclosed in which phosphorus pentachloride is first reacted with a nitrogenous base (e.g. pyridine) to form a complex and then ammonium chloride is added and the mixture reacted at a temperature above 90° C. Alternatively both phosphorus pentachloride and ammonium halide can be placed in the nitrogenous base and reacted at a temperature below about 70° C. and the mixture then heated to a temperature above 90° C. to initiate a second reaction which forms cyclic phosphonitrilic chloride.

Although the above process is rapid and gives good yields of trimer, it suffers the economic penalty of providing no means to recover or reuse pyridine. A need exists for a process that will give the same high yield and reaction rate of Allcock et al. and at the same time conserve the nitrogenous base.

SUMMARY OF THE INVENTION

It has now been discovered that when polyphosphonitrilic halide is made by reacting phosphorus pentahalide with ammonium halide in a hydrogen halide complex of a nitrogenous base that the polyphosphonitrilic halide product can be separated from the residual nitrogenous base-hydrogen halide complex and that this residual complex can be recycled as the initial reaction medium for a process in which $NH_3$ or ammonium halide is added to the residual complex which is then reacted with phosphorus pentahalide to form polyphosphonitrilic halide. The phosphonitrilic halide is dissolved in a solvent for recovery. The reaction also forms additional nitrogenous base-hydrogen halide complex. The polyphosphonitrilic halide-solvent phase can be separated from the residue and the residue can be recycled to a subsequent procedure conducted in the same manner. The process is most useful in making cyclic phosphonitrilic halides.

DESCRIPTION OF THE PREFERRED EMBODIMENTS

A preferred embodiment of the invention is a process for making a cyclic or linear polyphosphonitrilic chloride containing from 3 to about 7 ($PNX_2$) units in the case of cyclics and about 1 to 10,000 or more ($PNX_2$) units in the case of linears wherein X is halogen, by reacting about 0.5–5.0 moles of $PX_5$ with about 1.0 mole of $NH_4X$ in a reaction medium comprising a hydrogen halide complex of a nitrogen base selected from pyridine, substituted pyridines or mixtures thereof. The polyphosphonitrilic halide is then separated from the reaction mixture and the remaining hydrogen halide complex is recycled as at least part of the initial reaction medium of the next run carried out in the same manner.

A more preferred embodiment of the invention is a process for making cyclic phosphonitrilic halide containing from 3 to 7 ($PNX_2$) units wherein X is halogen, said process comprising:

(a) mixing about 1–20 moles of a hydrogen halide complex of a nitrogen base selected from pyridine, substituted pyridines and mixtures thereof with 1 mole of $NH_3$ to form a solution or slurry of ammonium halide in said nitrogen base and/or hydrogen halide complex thereof, said solution or slurry having an ammonium halide:nitrogen base or hydrogen halide complex thereof mole ratio of about 1:1–20, (b) adding phosphorus pentahalide and a solvent for cyclic phosphonitrilic halide to said solution or slurry in an amount which provides 0.5–5 moles of phosphorus pentahalide for each mole of ammonium halide, (c) reacting the resultant mixture at a temperature above about 90° C. up to reflux to form said phosphonitrilic halide and hydrogen halide complex of said nitrogen base, and (d) separating a solution of said cyclic phosphonitrilic halide in said solvent from a second phase comprising said hydrogen halide complex of said nitrogen base.

The preferred nitrogenous bases are those that include in their structure a pyridine ring. Examples of these are pyridine, alpha-picoline, β-picoline, gamma-picoline, quinoline, isoquinoline, 7-methylquinoline, 2,3-dimethylquinoline, lepidine, quinaldine, acridine, quinolinic acid, nicotinic acid, 2-aminopyridine, 2-phenylpyridine and the like including mixtures thereof. The most preferred nitrogenous base is the compound pyridine. The foregoing nitrogenous bases are referred to collectively as pyridine and substituted pyridines. In the following discussion pyridine will be used for exemplification but it is understood that any of the other nitrogenous bases may be substituted for pyridine but not necessarily with equal results.

Instead of pyridine or substituted pyridines, other nitrogen bases can be used. These include any tertiary amine that will form a hydrogen halide complex which can be molten at reaction temperature without decomposing.

The initial hydrogen halide complex of the nitrogen base could be made by merely adding hydrogen halide to the nitrogen base but this is not a preferred method. In a highly preferred method which will be described later the hydrogen halide complex is the recycled residue from a previous procedure. If one chooses to separately make the hydrogen halide complex, any hydrogen halide can be used that will form a nitrogen base complex that is molten at reaction temperatures including HCl, HBr, HF and HI or mixtures thereof but the preferred hydrogen halide is HCl. In the following discussion HCl will be used to represent the hydrogen halide with the understanding that any of the other hydrogen halides could be substituted for HCl.

The amount of HCl added is preferably in the range of about 0.1–2.0 mole parts per mole part of pyridine. More preferably the amount is about 0.2–1.0 mole parts HCl per mole part of pyridine. This would require about 1–5 mole parts of pyridine to adsorb 1 mole part of HCl forming 1 mole part of pyridine-hydrogen chloride complex. Under these conditions with excess pyridine it is believed that the mono-HCl complex forms but whether the mono- or di-HCl complex forms is not critical to the success of the process.

The reaction of HCl with pyridine is exothermic. Temperature is not critical so it can be carried out over a wide temperature range. Preferably it is conducted at a temperature high enough to maintain a liquid phase. Pure pyridine-hydrogen chloride complex has a melting point of 82° C.

In a preferred mode, $NH_3$ is then added to convert at least part of the pyridine-HCl complex to $NH_4Cl$ in situ. In the following discussion $NH_4Cl$ can be any $NH_4X$ salt. The amount of $NH_3$ can range from about 0.01–1.0 mole parts per mole part of HCl in the complex. More $NH_3$ can be added but this will not have any affect on the reaction. A more preferred range is about 0.25–1.0 moles of $NH_3$ for each 1–5 mole parts of pyridine-HCl complex.

The temperature of the reaction mixture during addition of the $NH_3$ should be high enough to maintain the pyridine-HCl complex in the liquid phase. Although pyridine-HCl has a melting point of 82° C. the impure mixture needs to be higher than this temperature to remain molten.

Phosphorus pentahalide can be added to the reaction mixture before the $NH_3$, concurrently with the $NH_3$ or after the $NH_3$. It is generally more convenient to add the phosphorus pentahalide after adding the $NH_3$. Any phosphorus pentahalide can be used such as $PCl_5$, $PBr_5$, $PBrCl_4$, $PBr_2Cl_3$, and the like. The preferred phosphorus pentahalide is phosphorus pentachloride, $PCl_5$ which will be used in the following discussion with the understanding that any of the other phosphorus pentahalides can be substituted for the $PCl_5$.

In an alternate mode of operation, the $PCl_5$ can be added prior to the $NH_3$. Since there isn't any $NH_4Cl$ present at this stage, this can be conducted at higher temperatures, i.e. above 70° C. up to reflux. Then the $NH_3$ can be added all at once or over a period of time to form $NH_4Cl$ which readily reacts with the $PCl_5$ above 90° C. up to reflux. Alternatively solid $NH_4Cl$ could be added. The relative amount of reactants used in this mode of operation are the same as in the preferred mode.

Returning to the discussion of the preferred mode, the amount of $PCl_5$ added on a mole basis can be more or less than the amount of $NH_4Cl$ formed by the addition of $NH_3$ to the pyridine-HCl complex. When an excess of $PCl_5$ is used, the reaction prefers to form a linear phosphonitrilic chloride oligomer containing about 1–10,000 or more $(PNCl_2)$ units. When the desired products are linear phosphonitrilic halide oligomers, it is preferred to react a molar excess of $PCl_5$ with the $NH_4Cl$. A useful ratio is about 1.0–5 moles of $PCl_5$ per mole of $NH_4Cl$ and more preferably about 1–3 moles of $PCl_5$ per mole of $NH_4Cl$.

In order to maximize the amount of cyclics, the amount of $PCl_5$ should not greatly exceed the amount of $NH_4Cl$ and preferably is equal or slightly less than the amount of $NH_4Cl$ on a stoichiometric basis. The amount of $NH_4Cl$ closely corresponds to the moles of $NH_3$ added to form the $NH_4Cl$. A preferred amount of $PCl_5$ is about 0.5–1.2 mole parts per mole part of $NH_4Cl$ formed in the reaction mixture. More preferably the amount of $PCl_5$ is about 0.75–1.1 moles per mole of $NH_4Cl$ in the reaction mixture and most preferably about 0.9–1.0.

The $PCl_5$ is preferably added as a solution or slurry in a solvent for the cyclic phosphonitrilic chloride trimer although the phosphorus pentachloride can be added in a dry or molten form and solvent can be added separately either prior to or after the addition of the $PCl_5$ or after the reaction is complete. Alternatively the pyridine-hydrogen chloride complex, before or after $NH_3$ addition, can be added to the solution or slurry of $PCl_5$ in the solvent for cyclic trimer. Instead of adding $PCl_5$, chlorine and $PCl_3$ can be added to form $PCl_5$ in situ.

Useful solvents for cyclic phosphonitrilic chloride trimer include any liquid that is substantially inert under the reaction conditions and which can serve to dissolve the cyclic trimer when it forms. The preferred solvents are the mono or poly halogenated aliphatic and aromatic hydrocarbons, especially the chlorinated hydrocarbons such as chloroform, carbon tetrachloride, 1,1-di-chloroethane, 1,2-dichloroethane, 1,1,1-trichloroethane, sym-tetrachloroethane and the like. The solvent can have a normal boiling point from about 30° C. up to 250° C. or higher. In general, the solvent should boil well above room temperature and below the decomposition temperature of the reaction mixture. A useful temperature range is about 35° C. up to 250° C. These include solvents such as methylene chloride, propyl chloride, methylene bromide, bromochloromethane, butyl chloride, 1,2-dibromoethane, 1,1-dibromoethane, 1,2-dichloroethane, 1,1-dichloroethane, dichlorobenzene, dibromobenzene, trichlorobenzene, dichlorotoluene, dibromotoluene, chlorobromobenzene, and the like. The lower boiling solvents, for example those having a normal boiling point from about 35° C. up to 120° C. are preferably used when the main reaction is conducted without a solvent and the solvent is added after the reaction to extract the phosphonitrilic halide. This extraction is preferably conducted at a temperature high enough to maintain the hydrogen halide-nitrogen base complex in a molten state so the very low boiling solvents will require pressure in order to prevent boiling during the extraction step.

More preferably the solvent should have a normal boiling point of at least 90° C. up to the decomposition temperature of the reaction mixture so that the reaction of PCl$_5$+NH$_4$Cl can be carried out without resorting to a pressure reactor. These solvents include 1,1,2-trichloroethane, sym-tetrachloroethane, 1,1,1,2-tetrachloroethane, monochlorobenzene, 2-chlorotoluene, 3-chlorotoluene, 4-chlorotoluene, monochloroxylenes, o-dichlorobenzene, m-dichlorobenzene, p-dichlorobenzene and the like. Most research has been conducted using monochlorobenzene which is the preferred solvent. As mentioned above the solvent should have a normal boiling point above about 90° C. so that the reaction to form cyclic trimer can be conducted above 90° C. without resorting to a pressure system although the reaction may be conducted under pressure if desired. For example pressures up to 1000 psig or higher can be used. More preferably the solvent will have a boiling point of about 90°-200° C., still more preferably about 110°-200° C. and most preferably about 120°-150° C. The amount of solvent is not critical as long as it is sufficient to dissolve the cyclic phosphonitrilic chloride produced in the reaction. A useful range is about 1-100 parts by weight solvent for each part by weight phosphorus pentachloride used in the reaction.

In most of the discussion, the solvent is introduced into the reaction mixture along with the PCl$_5$. This is not a critical limitation since the solvent can be added at any time. For example, the entire reaction can be run without solvent and the solvent only used at the end to extract the polyphosphonitrilic halide from the pyridine-hydrogen halide heel. Alternatively, the solvent can be introduced at any stage or at multiple stages since its main function is to dissolve the product and extract it into a solvent phase.

The phosphorus pentachloride-solvent mixture can be added to the pyridine-hydrochloride complex and NH$_4$Cl all at once or it can be added over an extended period of time. On a large scale it is preferred to add the PCl$_5$-solvent mixture to the pyridine-hydrochloride complex and NH$_4$Cl also containing a solvent for cyclic phosphonitrilic chloride over an extended period of time, for example from 1-8 hours or more. Operating in this manner, the reaction forms cyclic phosphonitrilic chloride trimer rapidly and in high yield. To maximize linear phosphonitrilic chloride yield the reverse addition is preferred.

When making cyclic trimer, the overall idealized reaction disregarding any pyridine-HCl complex consumed and formed and other phosphazene species formed is represented by the following equation:

$$3PCl_5 + 3NH_4Cl \rightarrow (PNCl_2)_3 + 12HCl$$

The HCl evolved in the reaction converts any pyridine or substituted pyridines present to their HCl complex. Shown in a sequential manner starting with the initial pyridine-HCl complex the reaction sequence can be depicted as follows:

1-20 moles Py-HCl + 1 mole NH$_3$ → 1 mole NH$_4$Cl + 1 mole Py + 0-19 moles Py-HCl    I I + 0.5-1.2 mole PCl$_5$ → 0.5-1(PNCl$_2$) units + 1-20 moles Py-HCl + 1-3 moles HCl + 0-0.5 moles NH$_4$Cl + 0-0.2 moles PCl$_5$    II Thus the second reaction (II) regenerates the pyridine-HCl (Py-HCl) complex consumed by the initial reaction (I) by NH$_3$ in forming NH$_4$Cl. In fact the amount of HCl formed in the reaction of NH$_4$Cl with PCl$_5$ is so great that even if the initial reaction mixture contained only pyridine and ammonium chloride, the final reaction mixture would be phosphonitrilic chloride and pyridine-HCl complex unless the original reaction mixture contained over 4 moles of pyridine per mole of PCl$_5$.

Some of the reactions involved in the overall process are exothermic and require caution. For example, if Py-HCl is made by the reaction of pyridine and HCl the reaction is very exothermic and requires care. Likewise if PCl$_5$ is added to pyridine an exothermic reaction occurs in forming a pyridine-PCl$_5$ complex. If PCl$_5$ is added to a mixture of Py-HCl, pyridine and NH$_4$Cl at a temperature over about 80° C. a reaction will ensue forming either cyclic or linear phosphonitrilic chloride depending upon reactant ratios. The reaction of PCl$_5$ with NH$_4$Cl to form phosphonitrilic chloride is in itself endothermic but the reaction evolves 4 moles of HCl for each (PNCl$_2$) unit formed and the HCl will react exothermically with pyridine to form Py-HCl until all the pyridine is consumed. However, if PCl$_5$ is added to a mixture of Py-HCl and NH$_4$Cl, the reaction is not exothermic since the reaction of PCl$_5$ with NH$_4$Cl is endothermic and there isn't any free pyridine to react with the HCl evolved.

In another embodiment, the NH$_3$ and PCl$_5$ are added to the pyridine-HCl complex concurrently in the desired mole ratio so that the pyridine-HCl complex functions as a reaction medium. Any pyridine-HCl complex converted to pyridine by reaction with NH$_3$ with pyridine-HCl is immediately converted back to pyridine-HCl by HCl generated in the overall reaction. For example both NH$_3$ and a solution of PCl$_5$ in a solvent (e.g. chlorinated aliphatic or aromatic hydrocarbon having a normal boiling point over 90° C.) in the mole ratio of 1 mole part NH$_3$ per each 0.5-1.2 mole parts of PCl$_5$ can be fed to molten pyridine-hydrochloride complex and reacted at a temperature of 90° C. up to reflux to form cyclic phosphonitrilic chloride trimer in a single step. The cyclic trimer will extract into the solvent phase and the second phase will be mainly pyridine-HCl complex which may contain some NH$_4$Cl. The amount of pyridine-HCl complex reaction medium should be about 1-20 mole parts, more preferably 2-4 mole parts, per each mole part of NH$_3$ or PCl$_5$ depending on which of these is present in the lower mole amount.

In another embodiment, PCl$_3$, chlorine and ammonia are all concurrently fed to a pyridine-hydrogen chloride complex at temperatures from melting up to 200° C. or higher to form phosphonitrilic chloride in one step. As in the other embodiments, the product is recovered by solvent extraction and the pyridine-HCl residue is recycled.

Following the reaction to form phosphonitrilic chloride and regenerate pyridine-HCl complex by any of the foregoing routes, the reaction mixture is allowed to separate into two phases, a solvent phase which contains the phosphonitrilic chloride and a pyridine-HCl complex phase. This separation should be conducted at a temperature high enough to maintain the pyridine-HCl complex in a molten form although on a small scale it can be cooled to solidify the pyridine-HCl liquid and the solvent phase containing the phosphonitrilic chloride merely poured from the solidified pyridine-HCl complex. The separation can be readily conducted by draining the molten pyridine-HCl from the bottom of the reaction vessel or by decanting or syphoning the solvent-phosphonitrilic chloride solution from the top of the reaction mixture.

Linear phosphonitrilic chloride oligomers can be recovered from the solvent phase by conventional means such as by distillation or by mixing the solvent phase with a medium that is a non-solvent for the oligomer but a solvent for the solvent. Cyclic phosphonitrilic chloride trimer can be recovered from the solvent phase by conventional means such as by distillation or crystallization.

In a most preferred embodiment of the invention the molten pyridine-HCl phase left as a "heel" following removal of the phosphonitrilic chloride-solvent phase, is recycled to the next process sequence. This eliminates the necessity of separately forming an initial pyridine-HCl complex. In fact the initial cycle of the present process would most preferably be conducted without forming pyridine-HCl by the separate step of adding HCl to pyridine but would be conducted by (i) adding $PCl_5$ to pyridine to form a pyridine-$PCl_5$ complex, (ii) mixing and reacting the pyridine-$PCl_5$ complex with a slurry of $NH_4Cl$ in a solvent such as monochlorobenzene at a temperature above about 90° C. to form phosphonitrilic chloride and pyridine-HCl complex or by (a) adding a solution of $PCl_5$ in a solvent such as monochlorobenzene to a slurry or solution of $NH_4Cl$ in pyridine at a temperature below about 80° C. to form a mixture comprising a pyridine-$PCl_5$ complex and $NH_4Cl$ in a solvent and then (b) heating this mixture above 90° C. up to reflux to cause a reaction which forms cyclic and/or linear phosphonitrilic chloride and generates pyridine-HCl complex. Both of these initial cycles are described in detail in U.S. application Ser. No. 756,799 filed July 19, 1985 by H. R. Allcock, S. J. Stinnett, J. B. Tedder, Jr., and J. R. Adams, Jr. and do not form part of the present invention. However this initial cycle following the process of Allcock et al. can function as a means of forming a pyridine-HCl complex which is used in the first step of the present process. After the initial cycle, the pyridine-HCl complex is formed by conducting a procedure of the present invention and separating the pyridine-HCl heel for recycle.

Still another embodiment of the same invention comprises a process for making phosphonitrilic halide, said process comprising
  (a) mixing about 1-20 mole parts of a hydrogen halide complex of pyridine or a substituted pyridine with about 0.5-5 mole parts of phosphorus pentahalide and a solvent for said phosphonitrilic halide to form a resultant mixture,
  (b) adding about 1 mole part of ammonium halide to said resultant mixture and reacting at a temperature above about 90° C. to form said phosphonitrilic halide,
  (c) separating the solvent phase containing said phosphonitrilic halide from the pyridine-hydrogen halide phase,
  (d) recovering said phosphonitrilic halide from said solvent phase and
  (e) recycling said pyridine-hydrogen halide phase as at least part of said hydrogen halide complex of pyridine or substituted pyridine used in step (a) of a subsequent procedure carried out in substantially the same way.

In this embodiment ammonium halide is used in place of ammonia. Following this, the process is substantially the same as when ammonia is used. The preferred ammonium halide is ammonium chloride and the preferred phosphorus pentahalide is phosphorus pentachloride. The same solvents and the same ratios are used with ammonium halide replacing ammonia on an equal mole basis.

In the above embodiment it is most preferred to use about 0.9-1.0 mole parts of $PCl_5$ per mole of $NH_4Cl$ when the desired product is cyclic phosphonitrilic chloride and to use about 1.0-5 moles of $PCl_5$ when the desired product is linear phosphonitrilic chloride.

The above embodiments have in common with the others the recycle of the pyridine-HCl heel to the start of the next cycle. It is also contemplated to be within the scope of the invention to use an operating scheme that alternates between embodiments on different cycles in a series. In other words, the first cycle can be conducted by reacting $PCl_5$ and ammonium chloride in pyridine, either sequentially or simultaneously to form a phosphonitrilic chloride-solvent phase and a pyridine-HCl phase. The phases are separated and the pyridine-HCl phase recycled to the next cycle.

In the second cycle, ammonia and phosphorus pentachloride could be added to the pyridine-HCl complex and reacted to form a phosphonitrilic chloride-solvent phase and a pyridine-HCl phase. The pyridine-HCl phase could again be recycled to the next cycle.

In the third cycle, ammonium chloride and phosphorus pentachloride could be added to the recycled pyridine-HCl and reacted to form a phosphonitrilic chloride-solvent phase and a pyridine-HCl phase and so forth.

All of the embodiments involve the reaction of an ammonia compound (e.g. $NH_3$ or $NH_4Cl$) and a phosphorus pentahalide (e.g. $PCl_5$) in contact with a pyridine-HX or substituted pyridine-HX reaction medium and, after removal of a solvent phase containing phosphonitrilic halide, the recycle of the pyridine-HX or substituted pyridine-HX heel to a subsequent cycle as part of the initial reaction components. Thus, an embodiment of the invention is a process for making phosphonitrilic halide in high yield and at a fast reaction rate by (a) reacting ammonia or ammonium halide or mixtures thereof with phosphorus pentahalide or its precursors such as $P+Cl_2$ or $PCl_3+Cl_2$, in a reaction medium comprising a hydrogen halide complex of a nitrogen base selected from pyridine, substituted pyridines or mixtures thereof and a solvent for cyclic phosphonitrilic halide to form a solvent phase containing said phosphonitrilic halide and a residue phase comprising a hydrogen halide complex of said nitrogen base, (b) separating said solvent phase from said residue phase, (c) recovering said phosphonitrilic halide from said solvent phase and (d) recycling said residual phase to the next cycle as at least part of the initial reaction medium.

Stated in another way to more clearly point out where the key features of the process reside, the invention is an improvement in the known process for making phosphonitrilic halide by reacting ammonium halide and phosphorus pentahalide. The improvement comprises conducting the reaction in a reaction medium comprising a hydrogen halide complex of a nitrogen base selected from pyridine, substituted pyridines and mixtures thereof and a solvent for phosphonitrilic halides to produce a solvent phase containing the phosphonitrilic halide product and a residual or heel phase comprising mainly a hydrogen halide complex of the nitrogen base and then recycling the residual phase to a subsequent cycle of the same process as at least part of the initial reaction medium. Alternatively the reaction can be conducted without any solvent and the solvent added at the end to extract the phosphonitrilic halide from the heel. The phosphonitrilic halide is recovered from the solvent phase by conventional methods.

The preferred reactants and ratios in the overall process as stated above are of course the same as in the sub-generic embodiments of the overall process.

The manner in which the process is conducted is shown in the following examples.

EXAMPLE 1

An Initial Cycle

In a reaction vessel fitted with a stirrer, reflux condenser, thermometer and heating means was placed 1,033 grams monochlorobenzene, 495 grams $PCl_5$ and 121 grams $NH_4Cl$. Then 500 grams of pyridine was added in small increments of about 30–40 ml each. The addition schedule and temperature was as follows:

| Time (min.) | Pyridine Increment (ml) | Addition Temp. (°C.) |
|---|---|---|
| 0 | 0 | |
| 3 | 35 | 29 |
| 4 | 0 | |
| 5 | 35 | 41 |
| 6 | 40 | 42 |
| 7 | 30 | 43 |
| 8 | 45 | 47 |
| 9 | 50 | 51 |
| 10 | 15 | 52 |
| 11 | remainder | 54 |

The mixture was then heated to reflux (about 130° C.) over a 10 minute period and maintained at reflux for 60 minutes. Heating and stirring was stopped and two phases separated. The upper solvent phase was decanted from the lower "heel" phase. The solvent phase contained 89.5 weight percent of the phosphorus initially charged as $PCl_5$. This has now been converted to polyphosphonitrilic chloride which analyzed 77.4 weight percent cyclic trimer, 3.5 weight percent cyclic tetramer and the remainder higher cyclics and linear oligomers.

EXAMPLE 2

A Recycle Run Using $NH_4Cl$

To a reaction vessel containing the molten pyridine-HCl heel from Example 1 was charged 121 grams of $NH_4Cl$. A solution of 495 grams of $PCl_5$ in 1,049 grams of monochlorobenzene was prepared by stirring and heating the mixture above 100° C. This $PCl_5$ solution was fed to the molten pyridine-HCl heel in three increments as follows.

| Time (min.) | Temp. (°C.) | Remarks |
|---|---|---|
| 0 | 141 | feed 25 seconds |
| 1 | 128 | |
| 2 | 125 | |
| 20 | 128 | |
| 21 | 131 | feed 25 seconds |
| 22 | 129 | |
| 24 | 126 | |
| 47 | 130 | |
| 49 | 131 | feed remainder (30 sec) |
| 51 | 123 | |
| 56 | 120 | |
| 62 | 122 | |

The mixture was then heated to reflux and stirred at reflux for about 1 hour. Heating and stirring was stopped and the phases separated. On further cooling the lower pyridine-HCl phase solidified. The upper phase was removed and found to contain 99.5 weight percent of the phosphorus initially charged to the reaction. The polyphosphazenes in the monochlorobenzene phase were 80.8 weight percent cyclic trimer, 2.2 weight percent cyclic tetramer and the balance higher cyclics and linear oligomers.

The heel from Example 2 was again recycled to Example 3 conducted in substantially the same manner as Example 2. The pyridine-HCl heel from Example 3 was in turn recycled to Example conducted in substantially the same manner. The results with these further recycle runs using $NH_4Cl$ were as follows.

| Example | Heel Recycled From Example | Percent of $P^1$ in Solvent | Product Trimer | Tetramer |
|---|---|---|---|---|
| 3 | 2 | 92.6 | 80.7 | 2.4 |
| 4 | 3 | 77.6 | 79.1 | 1.4 |

[1]Weight percent of total phosphorus in the $PCl_5$ charge.

EXAMPLE 5

An Initial Cycle

In a reaction vessel was placed 3173 grams monochlorobenzene, 1,485 grams $PCl_5$ and 363 grams of $NH_4Cl$. This mixture was stirred and then 1500 grams of pyridine was added as follows.

| Time (min.) | Temp. (°C.) | Total Pyridine Fed (ml) |
|---|---|---|
| 0 | 25 | 0 |
| 1 | 34 | 110 |
| 2 | 44 | 200 |
| 3 | 49 | 250 |
| 4 | 50 | |
| 5 | 58 | 350 |
| 6 | 70 | 400 |
| 7 | 73[1] | 425[1] |
| 20 | 68 | |
| 21 | 78 | 500 |
| 87 | 55 | |
| 88 | 62 | 600 |
| 89 | 63 | 675 |
| 91 | 61 | 1531 |
| 93 | 58[2] | |
| 110 | 95 | |
| 112 | 131 (reflux) | |
| 114 | 125 | |
| 134 | 124 | |
| 242 | 131 | |

[1]Stop pyridine feed to allow reaction to cool.
[2]Heat applied for second stage reaction.

Heating and stirring was stopped and the phases separated. The solvent phase contained 86.2 weight percent of the initial phosphorus charged as $PCl_5$. The phosphorus was in the form of phosphonitrilic chloride and analyzed 79.1 weight percent trimer and 4.9 weight tetramer.

EXAMPLE 6

A Recycle Run Using $NH_3$

The molten pyridine-HCl heel from Example 5 was placed in a reaction vessel. Then 3,068 grams of monochlorobenzene was added following which 70 grams of $NH_3$ was added at 129° C. After standing overnight, the reaction mixture was reheated in the morning to melt the pyridine-HCl complex and $NH_3$ feed was resumed for 63 minutes at 124°-129° C. to feed another 70 grams of $NH_3$ (total $NH_3$ feed 140 grams).

After cooling to 54° C. addition of 1,485 grams of dry $PCl_5$ was commenced in 100-200 gram portions over a 13 minute period at 54°-57° C. Stirring was continued at 59°-60° C. for ten minutes and then external heat was applied for 6 minutes raising the temperature from 52° to 58°. Heat was removed and temperature rise continued reaching 110° C. in 15 minutes. Heat was again applied and in 5 more minutes the reaction was at 130° C. (reflux). Stirring was continued for 23 minutes in the range of 117°-130° C.

Stirring was stopped and the phases separated. The lower phase solidified and the upper solvent phase was decanted. The solvent phase contained 77.7 weight percent of the phosphorus initially charged as $PCl_5$. The phosphorus was now polyphosphonitrilic chloride which analyzed 79.1 weight percent cyclic trimer, 3.8 weight percent cyclic tetramer and the balance higher cyclics and linear oligomers.

The pyridine-HCl residual heel from Example 6 was then recycled to the initial reaction mixture in Example 7 and the residual heel from Example 7 was in turn recycled to the initial reaction mixture of Example 8. The results with the recycle runs were as follows.

| Example | Heel Recycled From Example | Percent of P[1] in Solvent | Product | |
|---|---|---|---|---|
| | | | Trimer | Tetramer |
| 7 | 6 | 82.8 | 83.5 | 3.6 |
| 8 | 7 | 78.0 | 83.7 | 3.1 |

[1]Weight percent of phosphorus in the $PCl_5$ charge.

EXAMPLE 9

An Initial Cycle

In a reaction vessel was placed 1,038 grams of monochlorobenzene, 495 grams of $PCl_5$ and 121 grams of $NH_4Cl$. Then 500 grams of pyridine was fed slowly over a period of 10 minutes while keeping the temperature below 80° C. Then heat was applied and the temperature rose to reflux in about 4 minutes. Reflux was continued for 65 minutes and then the reaction mixture was filtered. The filtrate formed two phases. The upper solvent phase contained 88.3 weight percent of the phosphorus initially added as $PCl_5$ now in the form of polyphosphonitrilic chloride which analyzed 77.3 weight percent cyclic trimer, 3.8 weight percent cyclic tetramer and the balance higher cyclics and linear oligomers. The pyridine-HCl residual heel was saved for recycle.

EXAMPLE 10

A Recycle Run Using $NH_4Cl$

In a reaction vessel was placed the residual pyridine-HCl heel from Example 9 and 10 grams of pyridine (make-up for small pyridine losses). Then 121 grams of $NH_4Cl$ was added. A solution of 495 grams of $PCl_5$ in 1,041 grams of monochlorobenzene was added to the mixture in increments over a 41 minute period as follows.

| Time (min.) | Temp. (°C.) | Remarks |
|---|---|---|
| 0 | 133 | feed $PCl_5$ solution 20 seconds |
| 13 | 131 | feed $PCl_5$ solution 20 seconds |
| 36 | 130 | feed $PCl_5$ solution 20 seconds |
| 41 | 123 | feed $PCl_5$ solution 5 seconds |
| 111 | 132 | cook period over |

The molten product was filtered to remove a small amount of solids. The phases separated and the pyridine-HCl heel was recycled to the next run. The results of this example and subsequent recycle runs each using recycle from the prior run are shown in the following table.

| Example | Heel Recycled From Example | Percent of P[1] in Solvent | Product | |
|---|---|---|---|---|
| | | | Trimer | Tetramer |
| 10 | 9 | 87.2 | 77.3 | 2.8 |
| 11 | 10 | 94.5 | 79.3 | 2.8 |
| 12 | 11 | 92.4 | 77.4 | 1.6 |
| 13 | 12 | 92.1 | 82.2 | 2.1 |
| 14 | 13 | 87.7 | 75.7 | 1.3 |
| 15 | 14 | 95.7 | 74.5 | 1.3 |
| 16 | 15 | 90.3 | 78.5 | 1.6 |
| 17 | 16 | 91.0 | 79.3 | 3.7 |

[1]Weight percent of total phosphorus in the $PCl_5$ charge.

EXAMPLE 18

Synthesis of Pyridine Hydrochloride

In a glass reaction vessel was placed 1955 grams (24.7 moles) of pyridine. While stirring, dry HCl was injected below the liquid surface while cooling the vessel in an ice bath. Temperature gradually rose and when 230 grams of HCl was in, the temperature was 48° C. and the ice bath was removed. When 592 grams were in, the temperature was 119° C. and all solids melted. When 915 grams (25 moles) of HCl were in, the temperature was 150° C. and HCl break-through occurred. HCl feed was stopped.

Co-Feed of Chlorine and $PCl_3$

A 154 gram (2.9 moles) quantity of $NH_4Cl$ was added to the molten Py-HCl and then chlorine and $PCl_3$ were concurrently fed over a 50 minute period at 139°-149° C. Total feed was 254 grams (3.58 moles) of chlorine and 366 grams (2.66 moles) of $PCl_3$. The reaction was stirred at 135°-140° C. for 1 hour and then the stirrer was stopped. No phase separation was noted. A gram portion of cyclohexane was added to extract the phosphonitrilic chloride into a solvent phase and the phases were allowed to separate. The lower Py-HCl phase solidified on further cooling. The upper solvent phase excluding solvent was analyzed by NMR as follows:

| Phosphonitrilic Chloride as | |
|---|---|
| Cyclic trimer | 33.2 weight percent |
| Cyclic tetramer | 19.0 weight percent |
| Pentamer-hexamer | 10.5 weight percent |
| Higher cyclics and linears | 37.3 weight percent |

As the above results demonstrate, the new process makes it possible to conserve pyridine or similar pyridine-type nitrogen bases and at the same time obtain the high reaction rate and trimer yields obtainable with the pyridine catalyzed trimer process.

We claim:

1. A process for making a phosphonitrilic halide containing from 1 to 10,000 or more (PNX$_2$) units wherein X is halogen, said process comprising:
   (a) mixing about 1–20 moles of a hydrogen halide complex of a nitrogen base selected from pyridine, substituted pyridines and mixtures thereof with about one mole of NH$_3$ to form a solution or slurry of ammonium halide in said nitrogen base and/or hydrogen halide complex thereof, said solution or slurry having an ammonium halide:nitrogen base or hydrogen halide complex thereof mole ratio of about 1:1–20,
   (b) adding phosphorus pentahalide and a solvent for phosphonitrilic halide to said solution or slurry in an amount which provides 0.5–5 moles of phosphorus pentahalide for each mole of ammonium halide,
   (c) reacting the resultant mixture at a temperature above about 90° C. up to reflux to form said phosphonitrilic halide and hydrogen halide complex of said nitrogen base, and
   (d) separating a solution of said polyphosphonitrilic halide in said solvent from a second phase comprising said hydrogen halide complex of said nitrogen base.

2. A process of claim 1 conducted in the absence of said solvent for phosphonitrilic halide at a temperature above about 90° C. and below the decomposition temperature of the reaction mixture and wherein said solvent is added after step (c) to extract the phosphonitrilic halide.

3. A process of claim 1 wherein at least part of said hydrogen halide complex of said nitrogen base in step (a) is said second phase of step (d) formed in a prior procedure of claim 1.

4. A process of claim 3 wherein said hydrogen halide is hydrogen chloride, said phosphorus pentahalide is phosphorus pentachloride and said (PNX$_2$) unit is (PNCl$_2$).

5. A process of claim 4 wherein said nitrogen base is pyridine.

6. A process of claim 5 wherein said solvent for polyphosphonitrilic halide is a mono or polychloro aliphatic or aromatic hydrocarbon or mixture thereof having a boiling point above 90° C. up to about 200° C.

7. A process of claim 6 wherein said solvent is monochlorobenzene.

8. A process of claim 1 especially adapted to make cyclic phosphonitrilic halide containing from 3 to about 7 (PNX$_2$) units, said process comprising
   (a) mixing about 1–20 moles of a hydrogen halide complex of a nitrogen base selected from pyridine, substituted pyridines and mixtures thereof with 1 mole of NH$_3$ to form a solution or slurry of NH$_4$X in said nitrogen base and/or hydrogen halide complex thereof, said solution or slurry having an NH$_4$X:nitrogen base and/or hydrogen halide complex thereof mole ratio of about 1:1–20,
   (b) adding PX$_5$ and a solvent for cyclic phosphonitrilic halide to said solution or slurry in an amount which provides about 0.5–1.2 moles of PX$_5$ for each mole of NH$_4$X,
   (c) reacting the resultant mixture at a temperature above about 90° C. up to reflux to form said cyclic polyphosphonitrilic halide and hydrogen halide complex of said nitrogen base and
   (d) separating a solution of said cyclic phosphonitrilic halide in said solvent from a second phase comprising a hydrogen halide complex of said nitrogen base.

9. A process of claim 8 wherein steps (a), (b) and (c) are conducted in the absence of said solvent for cyclic phosphonitrilic halide at a temperature above about 90° C. and below the decomposition temperature of the reaction mixture and wherein said solvent is added after step (c) to extract the cyclic phosphonitrilic halide.

10. A process of claim 8 wherein at least part of said hydrogen halide complex of said nitrogen base in step (a) is said second phase of step (d) formed in a prior procedure of claim 8.

11. A process of claim 10 wherein said hydrogen halide is hydrogen chloride, said PX$_5$ is PCl$_5$ and said (PNX$_2$) unit is (PNCl$_2$).

12. A process of claim 11 wherein said nitrogen base is pyridine.

13. A process of claim 12 wherein said solvents for cyclic phosphonitrilic halide is a mono or polychloro aliphatic or aromatic hydrocarbon or mixture thereof having a normal boiling point above about 90° C. up to about 200° C.

14. A process of claim 13 wherein said solvent is monochlorobenzene.

15. A process for making cyclic phosphonitrilic chloride containing at least 75 weight percent trimer, said process comprising:
   (a) mixing about 1–20 mole parts of a pyridine-hydrogen chloride complex with about 1.0 mole of NH$_3$ to convert at least part of said complex to ammonium chloride and pyridine,
   (b) adding a solution or slurry of phosphorus pentachloride in a chlorinated hydrocarbon solvent selected from mono and polychloro aliphatic or aromatic hydrocarbons or mixtures thereof having a normal boiling point above about 90° C. up to about 200° C., the amount of said phosphorus pentachloride being about 0.75–1.1 mole parts per mole part of said ammonium chloride in the reaction mixture,
   (c) reacting the mixture at a temperature above about 90° C. up to reflux to form said cyclic phosphonitrilic chloride and additional pyridine-hydrogen chloride complex,
   (d) separating the chlorinated hydrocarbon phase containing said cyclic phosphonitrilic chloride from the pyridine-hydrogen chloride phase,
   (e) recovering cyclic phosphonitrilic chloride trimer from said chlorinated hydrocarbon phase, and
   (f) recycling the pyridine-hydrogen chloride phase as at least part of said pyridine-hydrogen chloride complex used in step (a) of a!subsequent procedure carried out in substantially the same way as defined in this claim 15.

16. A process of claim 15 wherein said chlorinated hydrocarbon is a chlorinated benzene.

17. A process of claim 16 wherein said chlorinated benzene is monochlorobenzene.

18. A process for making cyclic phosphonitrilic halide containing at least 75 weight percent trimer, said process comprising:
   (a) mixing about 1–20 mole parts of a hydrogen halide complex of pyridine or a substituted pyridine with about 0.75–1.1 mole parts of a phosphorus pentahalide and a solvent for said cyclic trimer to form a resultant mixture,
   (b) adding about 1 mole part of NH$_3$ to said resultant mixture and reacting at a temperature above about 90° C. up to reflux to form said cyclic phosphonitrilic halide and additional pyridine or substituted pyridine-hydrogen halide complex,
(c) separating the solvent phase containing said cyclic phosphonitrilic halide from said hydrogen halide complex, and
(d) recovering said cyclic phosphonitrilic halide from said solvent phase.

19. A process of claim 18 wherein steps (a) and (b) are conducted in the absence of said solvent for said cyclic trimer at a temperature above about 90° C. and below decomposition temperature of the reaction mixture and wherein said solvent is added after step (b) to extract the cyclic phosphonitrilic halide.

20. A process of claim 18 including the further step:
(e) recycling said hydrogen halide complex separated in step (c) as at least part of said pyridine or substituted pyridine-hydrogen halide complex used in step (a) of a subsequent procedure carried out in substantially the same way as defined in this claim 20.

21. A process for making cyclic phosphonitrilic halide containing 3 to about 7 ($PNX_2$) units wherein X is halogen, said process comprising
(a) mixing about 1–20 mole parts of a hydrogen halide complex of a nitrogen base selected from pyridine or substituted pyridines with about 0.75–1.1 mole parts of phosphorus pentahalide and a solvent for said cyclic phosphonitrilic halide to form a resultant mixture,
(b) adding about 1 mole part of ammonium halide to said resultant mixture and reacting at a temperature above about 90° C. up to reflux to form said cyclic phosphonitrilic halide,
(c) separating the solvent phase containing said cyclic phosphonitrilic halide from the hydrogen halide complex phase,
(d) recovering said cyclic phosphonitrilic halide from said solvent phase and
(e) recycling said hydrogen halide complex phase as at least part of said hydrogen halide complex of pyridine or substituted pyridine used in step (a) of a subsequent procedure carried out in substantially the same way as defined in this claim 21.

22. A process of claim 21 wherein said phosphonitrilic halide is phosphonitrilic chloride, said hydrogen halide is hydrogen chloride, said nitrogen base is pyridine, said phosphorus pentahalide is phosphorus pentachloride, said ammonium halide is ammonium chloride and said solvent is a mono or polychlorinated aliphatic or aromtic hydrocarbon.

23. A process of claim 22 conducted in the absence of said solvent for cyclic phosphonitrilic halide at a temperature above about 90° C. and below decomposition temperature of the reaction mixture and wherein said solvent is added after step (b) to extract the cyclic phosphonitrilic halide.

24. A process of claim 22 wherein said solvent is monochlorobenzene.

25. A process of making cyclic phosphonitrilic halide containing from 3 to 7 ($PNX_2$) units wherein X is halogen, said process comprising
(a) mixing about 1–20 moles of a hydrogen halide complex of a nitrogen base selected from pyridine, substituted pyridines or mixtures thereof with 1.0 mole of ammonium halide to form a solution or slurry of ammonium halide in said hydrogen halide complex,
(b) adding phosphorus pentahalide and a solvent for cyclic polyphosphonitrilic halide to said solution or slurry in an amount which provides about 0.75–1.1 moles of phosphorus pentahalide for each mole of ammonium halide,
(c) reacting the mixture at a temperature above about 90° C. up to reflux to form said cyclic phosphonitrilic halide, and
(d) separating a solvent phase containing said cyclic phosphonitrilic halide and a second phase comprising a hydrogen halide complex of said nitrogen base and
(e) recycling said hydrogen halide complex in step (d) as at least part of the hydrogen halide complex used in step (a) of a subsequent procedure carried out in substantially the same way as defined in this claim 25.

26. A process of claim 25 for making cyclic phosphonitrilic chloride wherein said hydrogen halide is HCl, said nitrogen base is pyridine, said ammonium halide is ammonium chloride and said phosphorus pentahalide is $PCl_5$.

27. A process of claim 26 wherein said solvent is a chlorinated aliphatic or aromatic hydrocarbon or mixtures thereof having a boiling point above about 90° C. up to about 200° C.

28. A process of claim 27 wherein said solvent is mono- chlorobenzene.

29. A process for making a phosphonitrilic halide in high yield and at a fast reaction rate, said process comprising
(a) reacting ammonium halide (or mixtures of ammonia and hydrogen halide) with phosphorus pentahalide in a reaction medium comprising a hydrogen halide complex of a nitrogen base selected from pyridine, substituted pyridines or mixtures thereof and a solvent for phosphonitrilic halide to form a solvent phase containing said phosphonitrilic halide and a residue phase comprising a hydrogen halide complex of said nitrogen base,
(b) separating said solvent phase from said residue phase,
(c) recovering said phosphonitrilic halide from said solvent phase and
(d) recycling said residue phase to the next cycle as at least part of the initial reaction medium in step (a).

30. A process of claim 29 wherein said phosphonitrilic halide is phosphonitrilic chloride, said ammonium halide is ammonium chloride, said phosphorus pentahalide is phosphorus pentachloride, said hydrogen halide is hydrogen chloride, said nitrogen base is pyridine and said solvent is a mono or polychloro aliphatic or aromatic hydrocarbon.

31. In a process for making cyclic phosphonitrilic halide containing mainly trimer by reacting ammonium halide and phosphorus pentahalide, the improvement of conducting said reacting from the start in a reaction medium comprising a hydrogen halide complex of a nitrogen base selected from pyridine, substituted pyridines or mixtures thereof.

32. A process of claim 31 conducted in the presence of a solvent for cyclic phosphonitrilic halide whereby a solvent phase containing said cyclic phosphonitrilic halide and a residual phase comprising mainly a hydrogen-halide complex of said nitrogen base form and then recycling said residual phase to a subsequent procedure as at least part of said reaction mixture, said subsequent procedure being conducted substantially the same as defined in this claim 32.

33. A process of claim 32 wherein at least part of said ammonium halide is formed in situ by reacting $NH_3$ with said hydrogen halide complex of said nitrogen base.

34. A process of claim 32 wherein said ammonium halide is ammonium chloride, said phosphorus pentahalide is phosphorus pentachloride, said nitrogen base is pyridine, said hydrogen halide is hydrogen chloride and said solvent is a mono or polychloro aliphatic or aromatic hydrocarbon boiling above about 90° C. and below the decomposition temperature of the reaction mixture.

35. A process of claim 31 wherein
  (a) a solvent for cyclic phosphonitrilic halide is added after the reaction to extract said cyclic phosphonitrilic halide into a solvent phase,
  (b) said solvent phase is separated from a residual phase comprising mainly a hydrogen halide complex of said nitrogen base,
  (c) said cyclic phosphonitrilic halide is recovered from said solvent phase, and
  (d) said residual phase is recycled as at least part of said reaction medium in a subsequent procedure conducted in substantially the same way as defined in this claim 35.

36. A process of claim 35 wherein said phosphonitrilic halide is phosphonitrilic chloride, said ammonium halide is ammonium chloride, said phosphorus pentahalide is phosphorus pentachloride, said hydrogen halide is hydrogen chloride, said nitrogen base is pyridine and said solvent is a mono or polychloro aliphatic or aromatic hydrocarbon.

37. A process for making a phosphonitrilic chloride containing from 1 to 10,000 or more $(PNCl_2)$ units, said process comprising
  (a) forming a mixture of about one mole of $NH_4Cl$ in 1-20 moles of a molten HCl complex of a nitrogen base selected from pyridine, substituted pyridines and mixtures thereof,
  (b) co-feeding about 0.5-5 moles of $PCl_3$ and $Cl_2$ in about equal-mole amounts of the molten HCl complex,
  (c) adding a solvent for phosphonitrilic chlorides to extract the phosphonitrilic chlorides into a solvent phase,
  (d) separating the solvent phase from a residual phase comprising mainly an HCl complex of said nitrogen base and
  (e) re-cycling said residual phase as at least part of said HCl complex in step (a) of a subsequent process carried out in substantially the same way as defined in claim 37.

38. A process of claim 37 wherein said solvent of step (c) is added prior to step (b).

39. A process of claim 37 wherein the amount of $PCl_3$ and $Cl_2$ co-feed in step (b) is about 0.75-1.1 moles of each.

40. A process of claim 38 wherein the amount of $PCl_3$ and $Cl_2$ co-feed in step (b) is about 0.75-1.1 moles of each.

41. A process of claim 39 wherein said $NH_4Cl$ is formed in situ by adding about 1 mole of $NH_3$ to said HCl complex.

42. A process of claim 40 wherein said $NH_4Cl$ is formed in situ by adding about 1 mole of $NH_3$ to said HCl complex.

* * * * *